United States Patent
Gatzke et al.

(10) Patent No.: US 7,813,483 B2
(45) Date of Patent: *Oct. 12, 2010

(54) SYSTEM AND METHOD FOR PROVIDING PRESENCE INFORMATION TO VOICEMAIL USERS

(75) Inventors: Alan D. Gatzke, Bainbridge Island, WA (US); Aaron J. Belcher, Shoreline, WA (US)

(73) Assignee: Cisco Technology, Inc., San Jose, CA (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/178,712

(22) Filed: Jul. 11, 2005

(65) Prior Publication Data

US 2006/0245558 A1 Nov. 2, 2006

Related U.S. Application Data

(63) Continuation of application No. 11/116,829, filed on Apr. 28, 2005, now Pat. No. 7,623,633.

(51) Int. Cl.
H04M 1/64 (2006.01)
(52) U.S. Cl. .................. 379/88.12; 370/252; 370/260; 370/352; 370/354; 379/88.16; 379/88.17; 455/413; 706/47; 709/206
(58) Field of Classification Search ............. 379/88.19, 379/88.12, 88.16, 88.17; 709/206; 370/252, 370/260, 352, 354; 455/413; 706/47
See application file for complete search history.

(56) References Cited

U.S. PATENT DOCUMENTS

| | | | | |
|---|---|---|---|---|
| 6,631,181 | B1 | 10/2003 | Bates et al. | 379/88.18 |
| 6,631,183 | B1 | 10/2003 | Rautila et al. | 379/88.22 |
| 6,700,967 | B2 | 3/2004 | Kleinöder et al. | 379/201.1 |
| 6,707,890 | B1 | 3/2004 | Gao et al. | 379/88.12 |
| 6,842,505 | B1 | 1/2005 | Suder et al. | 379/88.01 |
| 6,879,677 | B2 | 4/2005 | Trandal et al. | 379/215.01 |
| 6,987,840 | B1 * | 1/2006 | Bosik et al. | 379/88.17 |
| 7,248,857 | B1 * | 7/2007 | Richardson et al. | 455/413 |
| 7,450,567 | B1 * | 11/2008 | Mamnani | 370/352 |

(Continued)

FOREIGN PATENT DOCUMENTS

EP 1 519 29 2 A1 3/2005

(Continued)

OTHER PUBLICATIONS

PCT Notification of Transmittal of the International Search Report and the Written Opinion of the International Searching Authority, or the Declaration with attached PCT International Search Report and the Written Opinion of the International Searching Authority in PCT International Application No. PCT/US2006/014108, dated Sep. 11, 2006, 11 pages.

(Continued)

*Primary Examiner*—Gerald Gauthier
(74) *Attorney, Agent, or Firm*—Baker Botts L.L.P.

(57) ABSTRACT

A method of providing telecommunication service includes receiving a call for a called party from a calling party. The method also includes determining a presence status of the called party and communicating a greeting for the calling party, wherein the greeting identifies the presence status of the called party.

22 Claims, 5 Drawing Sheets

U.S. PATENT DOCUMENTS

| | | | |
|---|---|---|---|
| 7,536,437 B2* | 5/2009 | Zmolek | 709/206 |
| 7,623,633 B2* | 11/2009 | Gatzke et al. | 379/88.12 |
| 7,693,139 B2* | 4/2010 | Glasser et al. | 370/354 |
| 2002/0076010 A1* | 6/2002 | Sahai | 379/88.19 |
| 2004/0042414 A1* | 3/2004 | Bouret et al. | 370/252 |
| 2004/0073614 A1* | 4/2004 | Blohm | 709/206 |
| 2005/0071428 A1* | 3/2005 | Khakoo et al. | 709/204 |
| 2005/0132006 A1* | 6/2005 | Horvitz et al. | 709/204 |
| 2006/0003766 A1* | 1/2006 | Parameswar et al. | 455/433 |
| 2006/0067250 A1* | 3/2006 | Boyer et al. | 370/260 |
| 2006/0245558 A1* | 11/2006 | Gatzke et al. | 379/88.16 |
| 2007/0258441 A1* | 11/2007 | Glasser et al. | 370/354 |
| 2008/0114713 A1* | 5/2008 | Gray | 706/47 |

FOREIGN PATENT DOCUMENTS

| | | |
|---|---|---|
| EP | 1 519 552 A1 | 3/2005 |
| WO | WO 03/019908 A2 | 3/2003 |

OTHER PUBLICATIONS

European Patent Office Communication pursuant to Article 94(3)EPC in European Application No. 06-758-347.6-1525, dated Nov. 20, 2009, 4 pages.

* cited by examiner

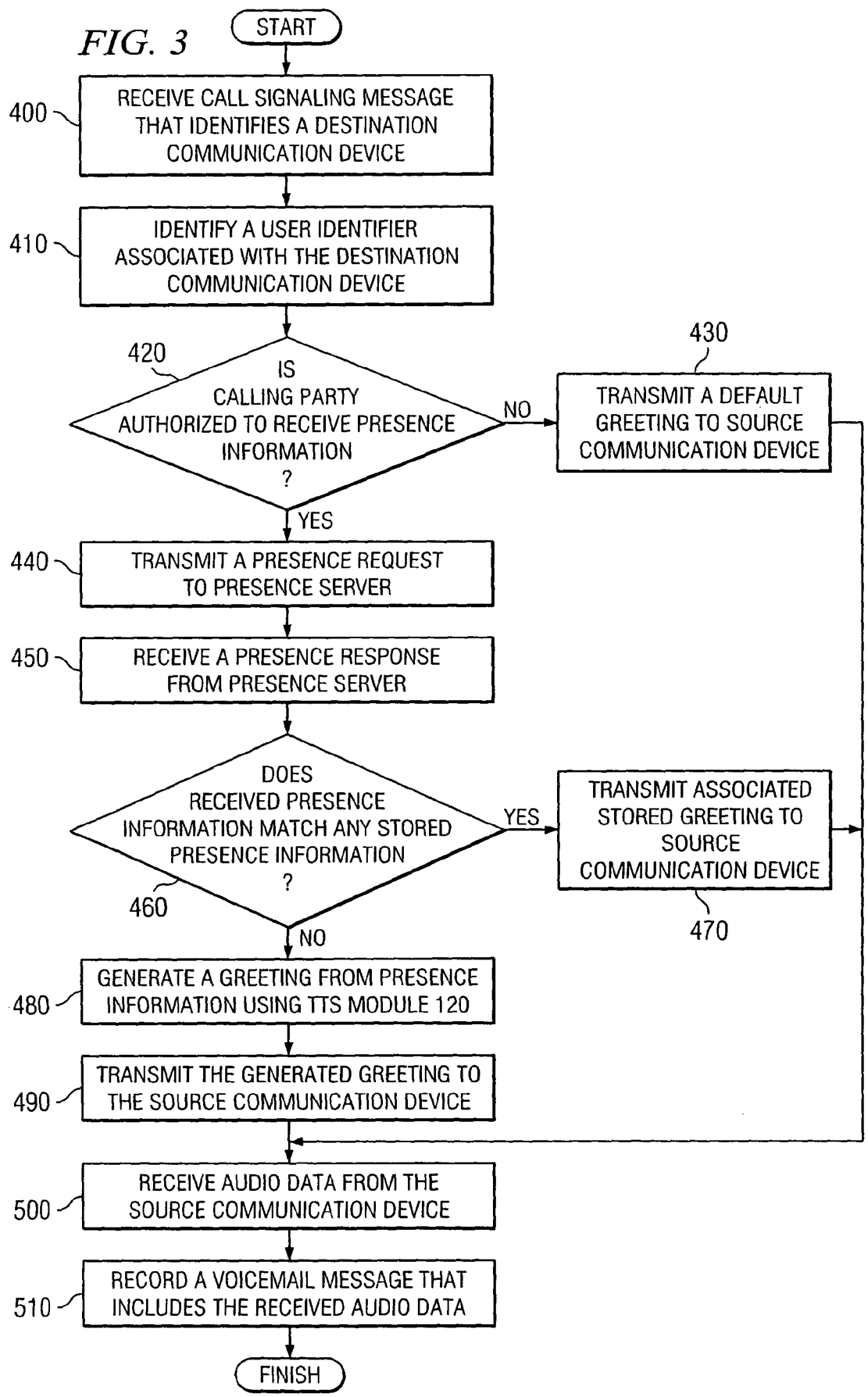

SYSTEM AND METHOD FOR PROVIDING PRESENCE INFORMATION TO VOICEMAIL USERS

CROSS REFERENCE TO RELATED APPLICATIONS

This application is a continuation of U.S. patent application Ser. No. 11/116,829 filed Apr. 28, 2005 now U.S. Pat. No. 7,623,633 and entitled "System and Method for Providing Presence Information to Voicemail Users".

TECHNICAL FIELD OF THE INVENTION

This invention relates in general to telecommunication systems and, more particularly, to providing improved voicemail services.

BACKGROUND OF THE INVENTION

When a call is forwarded to a voicemail system, the caller often hears a message that indicates the called party is not available and requests the caller to leave a message. Many systems may also allow a user to manually set an alternate greeting for his or her voicemail account. For example, the caller may hear a message such as "John is on vacation and will return on October 22nd." These specialized greetings however require manual configuration. As a result, the greeting will not be updated unless the called party remembers to change the message as his or her status changes and makes an effort to keep the message updated.

Furthermore, when a voicemail user accesses his or her voicemail account to listen to recorded voicemail messages, the user often attempts to return calls to individuals who have left voicemail messages for the user. The availability of the party that left the voicemail message may have changed since that individual left the message. For example, the party may have gone to a meeting and may no longer be available to speak with the user. As a result, returning the phone call at that time may not be productive, but the user may have no way of knowing this.

SUMMARY OF THE INVENTION

In accordance with the present invention, the disadvantages and problems associated with telecommunications have been substantially reduced or eliminated. In particular, a system and method for providing presence information to voicemail users is provided.

In accordance with one embodiment of the present invention, a method of providing communication service includes receiving a call for a called party from a calling party and determining a presence status of the called party. The method also includes communicating a greeting for the calling party. The greeting identifies the presence status of the called party.

In accordance with another embodiment of the present invention, a device for providing telecommunication service includes a memory and a processor. The memory is capable of storing processor instructions. The processor is capable of receiving a call for a called party from a calling party and determining a presence status of the called party. The processor is also capable of communicating a greeting for the calling party. The greeting identifies the presence status of the called party.

Technical advantages of certain embodiments of the present invention include a technique for providing voicemail system users useful information regarding the availability and/or location of other users. Other technical advantages of certain embodiments include a robust solution for providing availability information that is generated dynamically and techniques for limiting access to such availability information to authorized users. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a flowchart illustrating an example operation of the voicemail server.

DETAILED DESCRIPTION OF THE INVENTION

Figure 1:
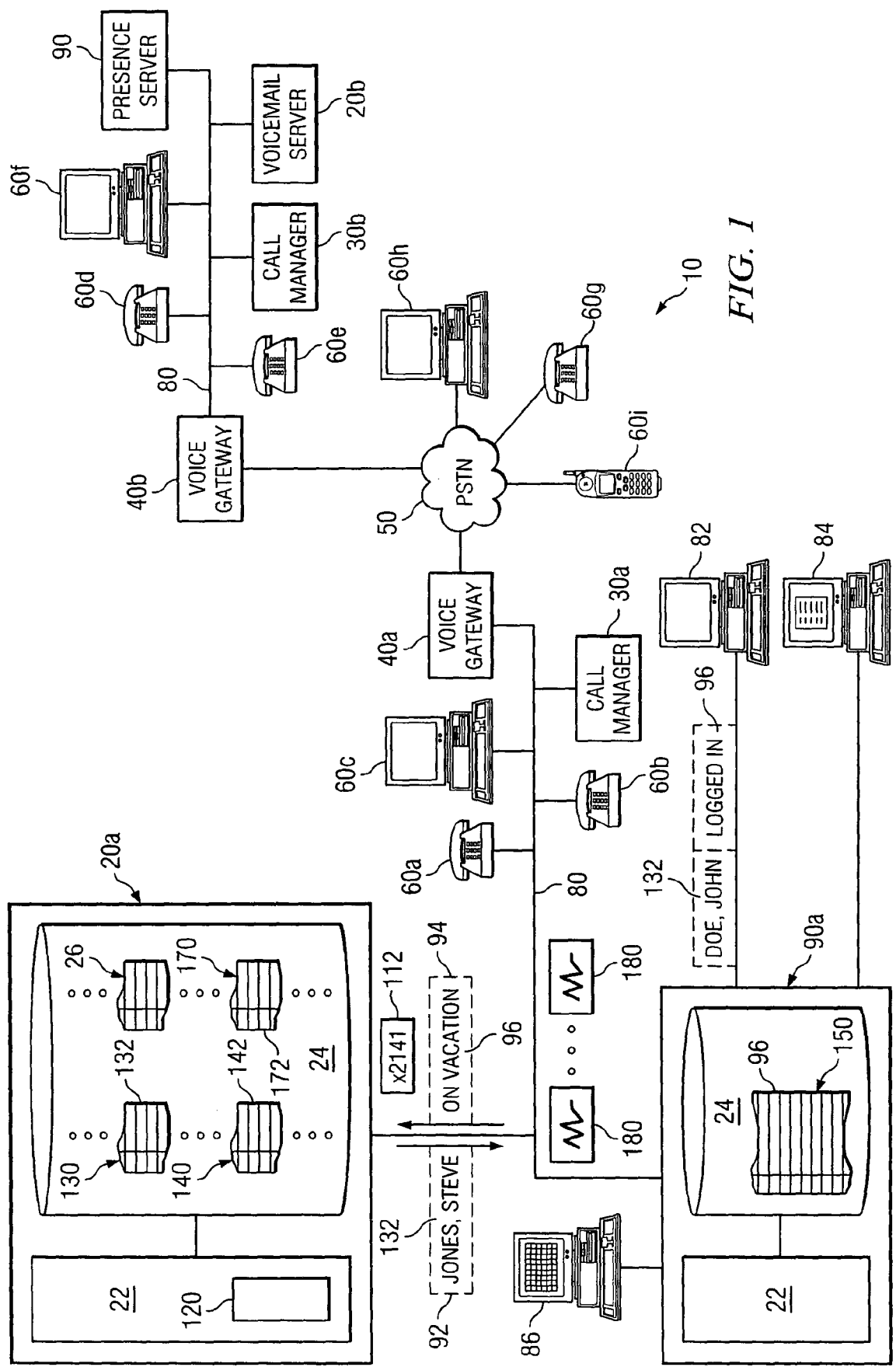
FIG. 1 illustrates a communication system according to a particular embodiment of the present invention.

FIG. 1 illustrates a communication system 10 according to a particular embodiment of the present invention. As shown, communication system 10 includes a plurality of local area networks (LANs) 80 coupled by a Public Switched Telephone Network (PSTN) 50. Each LAN 80 additionally couples a plurality of communication devices 60, a voicemail server 20, a call manager 30, a gateway 40, and a presence server 90 to one another and to PSTN 50. As described in greater detail below, voicemail servers 20 utilize information obtained from presence servers 90 to provide enhanced voicemail service.

Communication devices 60 may each represent any suitable combination of hardware, software, and/or encoded logic to provide communication services to a user. For example, communication devices 60 may represent telephones, computers running telephony software, video monitors, cameras, or any other communication hardware, software, and/or encoded logic that supports the communication of voice, video, text or other suitable forms of data using communication system 10. In the illustrated embodiment, communication devices 60a, 60b, 60d, and 60e represent Internet Protocol (IP) telephones and communication devices 60c and 60f represent telephony-enabled personal computers (PCs). Additionally, communication device 60i represents a cellphone coupling to communication system 10 through PSTN 50. Although FIG. 1 illustrates a particular number and configuration of communication devices 60, communication system 10 contemplates any number or arrangement of such components to support communication of media.

Gateways 40 may each represent any suitable combination of hardware and/or software that performs translation functions to facilitate seamless communication between PSTN 50 and LANs 80. These functions may include translation between transmission formats and between communications procedures. In addition, gateways 40 may also translate between audio and video CODECs and perform call setup and clearing on both the LAN side and the PSTN side. For example, gateway 40a may interface call manager 30a with PSTN 50. As a result, when a call is placed by communication device 60g using PSTN 50, gateway 40a translates the call format associated with PSTN 50 to a call format associated with call manager 30a, such as, for example, SIP or another suitable packet-based communication protocol.

Call managers 30 comprise any suitable combination of hardware and/or software operable to establish a connection between a calling component of communication system 10 and a called component, such as, for example, connecting a call between communication devices 60 or between a particular communication device 60 and voicemail server 20. In a particular embodiment, call managers 30 comprise Voice over Internet Protocol (VoIP) servers that perform the functions of signaling and session management within a packet telephony network. The signaling functionality of call managers 30 allow call information to be carried across network boundaries. The session management functionality of call managers 30 provides the ability to control the attributes of an end-to-end call across multiple networks in communication system 10. For example, in particular embodiments, call managers 30 may support SIP, which is a standard for multimedia conferencing over internet protocol. In such embodiments, call managers 30 may comprise SIP proxy servers that handle call processing, SIP requests, and SIP responses. Although the following description of call managers 30 is detailed with respect to SIP, it should be understood that call managers 30 may support other IP telephony protocols as well, such as the H.323 protocol. In particular embodiments, call managers 30 may also provide a number of telephony services for communication devices 60 and other devices located in LAN 80, including, but not limited to, call forwarding, teleconferencing, network monitoring, and CODEC translation.

Voicemail servers 20 support voicemail services for communication devices 60. More specifically, voicemail servers 20 may generate voicemail messages 26, receive voicemail messages 26 generated by other voicemail servers 20, store received or generated voicemail messages 26, and/or provide users access to stored voicemail messages 26. Voicemail server 20 may include any appropriate combination of hardware and/or software suitable to provide the described messaging functionality. The content and operation of particular embodiments of voicemail servers 20 are described in greater detail below with respect to FIGS. 2A and 2B. As shown with respect to voicemail server 20a in FIG. 1, voicemail servers 20 may each include a processor 22 and a memory 24. Furthermore, voicemail server 20a includes a text-to-speech (TTS) module 120 representing a software application running on processor 22. Memory 24 of voicemail server 20a also stores a user table 130, a greeting table 140, an indicator table 170, and one or more voicemail messages 26 recorded for users having accounts supported by voicemail server 20a. These elements of voicemail servers 20 and their operation and/or use are described in greater detail below with respect to FIGS. 2A and 2B.

Presence servers 90 generate, maintain, and/or disseminate presence information 96 relating to the presence status of one or more users of communication system 10. As used in this description and the claims that follow, presence information 96 may include any suitable information that describes the location of the relevant user and/or the availability of that user for the purposes of communicating with other users. Examples of presence information 96 utilized in particular embodiments of communication system 10 include, but are not limited to, information indicating whether a user is currently logged into a particular network or component; information identifying a wireless network in which the user is currently located, information indicating whether the user has used a particular component of communication system 10 within a predetermined time period; information identifying an activity presently scheduled for the user; and information specifying a physical location of the user. In the illustrated embodiment, presence server 90 maintains presence information 96 for particular users in a presence table 150 in memory 24 of presence server 90.

Additionally, although shown in FIG. 1 as a discrete component of communication system 10, presence server 90 may alternatively represent a portion of voicemail servers 20, call managers 30, gateways 40, or any other appropriate element of communication system 10. In general, presence server 90 may represent any combination of hardware and/or software operable to provide the described functionality. Furthermore, presence server 90 may collect presence information 96 from a variety of sources including other components of communication system 10, components external to communication system 10, and elements incorporated into presence server 90 itself. In particular, FIG. 1 illustrates three example sources that may provide presence information 96 to presence server 90 or that may provide other data to presence server 90 that presence server 90 may use to generate presence information 96. More specifically, the illustrated embodiment of communication system 10 includes a personal computer (PC) 82, an instant messenger client 84, and a calendar client 86. In the illustrated embodiment, instant messenger client 84 and calendar client 86 represent software applications running on PCs. In general, however, presence server 90 may obtain presence information 96 and/or data for generating presence information 96 from any appropriate sources.

LANs 80 and PSTN 50 provide connectivity between components coupled to them using any appropriate communication protocols. In particular embodiments, LANs 80 each represent all or a portion of an Ethernet network connecting the communication devices 60 of a particular entity, such as a company or a university campus. Furthermore, in particular embodiments, PSTN 50 represents all or a portion of the publicly-switched telephone network. Although FIG. 1 illustrates a particular embodiment of communication system 10 that includes particular types of networks, specifically LANs 80 and PSTN 50, coupling particular components of communication system 10, communication system 10 may include any appropriate types and numbers of networks.

In operation, voicemail servers 20 utilize information obtained from presence servers 90 to provide various forms of enhanced voicemail service. In particular, voicemail servers 20 may provide presence information 96 for a particular user as part of a greeting to callers leaving a voicemail message 26 for that user. This may help callers in deciding whether to leave a voicemail message 26 and/or what to say in the voicemail message 26. Additionally or alternatively, voicemail servers 20 may provide presence information 96 for a voicemail message sender to a recipient of the voicemail message 26. This may help the recipient determine whether to call the sender back immediately and/or whether to take any other appropriate actions in response to receiving the voicemail message 26. Both of these functionalities are described in greater detail below.

Voicemail Greetings

In particular embodiments of communication system 10, voicemail servers 20 may provide presence information 96 as part of a greeting played to callers leaving a voicemail message 26 for a particular voicemail user. FIG. 1 illustrates an example of the operation of a particular embodiment of communication system 10 under such circumstances. As shown in FIG. 1, a user (referred to here as the "calling party") using a communication device 60, for example communication device 60a, places a call to another user (referred to here as the "called party") of communication system 10 associated with another communication device 60, communication device 60b in this example. In this example, call manager 30a attempts to connect the incoming call to communication device 60b. If the called party does not answer the incoming call, call manager 30a may forward the incoming call to voicemail server 20a so that the calling party can record a voicemail message 26 for the called party.

In responding to the incoming call, voicemail server 20a plays a greeting associated with the voicemail account of the called party. As part of this process, voicemail server 20a may request presence information 96 from presence server 90 to play as part of the greeting or to be used in selecting an appropriate greeting. Voicemail server 20a may request presence information 96 from presence server 90a in any appropriate manner based on the configuration and capabilities of voicemail server 20a and presence server 90a.

For example, in particular embodiments, voicemail server 20 receives one or more call signaling messages, such as SIP invitations, from call manager 30a as part of the incoming call. These call signaling messages may specify a destination communication device 60 for the incoming call, in this case communication device 60b. In such embodiments, voicemail server 20a may then identify a user associated with communication device 60b, using information contained in user table 130. In the illustrated embodiment, user table 130 includes a plurality of user identifiers 132 and voicemail server 20 may select a user identifier 132 associated with the caller. Voicemail server 20a then requests presence information 96 from presence server 90a by transmitting a presence request 92 to presence server 90a that identifies the relevant user. In particular embodiments, presence request 92 may represent a SIP for Instant Messaging and Presence Leveraging Extensions (SIMPLE) request that includes the selected user identifier 132. The process by which voicemail server 20a requests presence information 96 is described in greater detail with respect to FIGS. 2A and 2B.

Additionally, particular embodiments of communication system 10 may implement security policies to limit access to presence information 96. As a result, voicemail server 20a may determine whether the calling party is authorized to access the presence information 96 of the called party prior to generating presence request 92 or at any other appropriate time. Voicemail server 20a may determine whether the calling party is authorized based on caller identification ("caller ID") information associated with the call, a personal identification number (PIN) supplied by the calling party, and/or any other appropriate criteria or consideration. For example, a particular voicemail server 20a may determine that a particular calling party is not authorized to access presence information 96 associated with the called party based on the fact that caller ID information associated with the relevant call indicates that the call originates from a communication device 60 external to LAN 80a in which voicemail server 20a is located. In such embodiments, if the relevant voicemail server 20a determines that the calling party is not authorized to access presence information 96 associated with the called party, voicemail server 20a may decide not to generate presence request 92 and may instead play a default greeting. If, however, voicemail server 20a determines that the calling party is authorized to access presence information 96 for the called party, voicemail server 20a may generate presence request 92 and transmit presence request 92 to presence server 90a, as described above.

Furthermore, in particular embodiments, presence server 90a may support multiple levels of authorization for different types of callers. As one example, presence server 90a may be configured to provide certain generic types of presence information, such as "Out of Office," to an external caller and more detailed presence information, such as "In Meeting in Conference Room 3," to the recipient's supervisor. As a result, presence request 82 may specify an authorization level associated with the relevant caller.

In response to receiving presence request 92, presence server 90a generates or accesses presence information 96 that describes the presence status of the user specified by the user identifier 132 in the presence request 92. In particular embodiments, presence server 90a maintains a presence table 150 containing up-to-date presence information 96 for each user of communication system 10. In such embodiments, presence server 90a may retrieve presence information 96 associated with the user identified in presence request 92 from presence table 150. An example of this process is described in greater detail with respect to FIG. 2B. Furthermore, if presence request 82 specifies an authorization level associated with the caller, presence server 90a may use the authorization level to choose between multiple types of presence information 96 maintained by presence server 90a, to limit the content of presence information 96 provided by presence server 90a, or other too otherwise modify the amount or nature of presence information 96 generated or retrieved by presence server 90a.

To facilitate generation of presence information 96, components of communication system 10 that monitor the presence status of users or that provide information related to the presence status of users may send presence server 90a information pertaining to the presence status of a particular user periodically or whenever the presence status of the user changes. As noted above, these various sources may provide various types of information pertaining to the presence of the user. As one example, PC 82 may notify presence server 90a whenever a user logs in or logs out of PC 82. As another example, instant messenger client 84 may notify presence server 90a whenever a user initiates or terminates a conversation with another user or may provide presence server 90a information pertaining to the amount of time that has passed since the user's last keystroke. As yet another example, calendar client 86 may notify presence server 90a whenever an event scheduled on the user's calendar begins or ends and may also inform presence server 90a of the type of scheduled event, such as, for example, "meeting," "vacation," or "sales call." Presence server 90a may then use the information received from the various sources to generate presence information 96 and then store presence information 96 in presence table 150 for later use.

As an alternative to maintaining a data structure such as presence table 150 that includes presence information 96, presence server 90a may instead poll the various sources used by presence server 90a whenever presence server 90a receives a presence request 92. More specifically, presence server 90a may request information from PC 82, instant messenger client 84, and/or calendar client 86 related to the presence status of the relevant user and may generate presence information 96 based in any suitable manner on the requested information. In general, however, presence server 90a may generate or access presence information 96 in any appropriate manner.

After generating or accessing presence information 96, presence server 90a transmits presence information 96 to voicemail server 20a. Presence server 90a may transmit presence information 96 to voicemail server 20a in any suitable form based on the configuration and capabilities of presence server 90a and voicemail server 20a. In particular embodiments, presence server 90a transmits a presence response 94 that contains the requested presence information 96. Moreover, in particular embodiments, presence response 94 represents a SIMPLE response that includes presence information 96 in any suitable formats such as, for example, in a text format. In the illustrated example, presence server 90 transmits presence response 94 that includes presence information 96 indicating that the relevant user is "On Vacation."

Upon receiving presence information 96 from presence server 90a, voicemail server 20a selects or generates a greeting to play to the calling party. For example, voicemail server 20a, in particular embodiments, maintains a greeting table 140 that includes one or more stored greetings 142. Each stored greeting 142 is associated with one or more presence statuses recognized by communication system 10. Stored greetings 142 may represent any appropriate form of audio data. In particular embodiments, stored greetings 142 represent WAV files. Voicemail server 20a may determine a current presence status of the called party based on presence information 96 received from presence server 90a and may identify a stored greeting 142 associated with this presence status. This matching process is described in greater detail below with respect to FIG. 2A.

Alternatively, voicemail server 20a may utilize TTS module 120 to dynamically generate a greeting based on presence information 96. For example, as shown, TTS module 120 may receive a presence response 94 that includes the text "On Vacation." TTS module 120 may generate a synthesized-speech audio greeting based on the text "On Vacation." Furthermore, particular embodiments of voicemail server 20a may utilize both techniques, with voicemail server 20a attempting to match presence information 96 to a recorded greeting and, if no recorded greeting matches presence information 96, generating a greeting using TTS module 120. An example of this process is also described in greater detail with respect to FIG. 2B.

After selecting a stored greeting 142 or generating a greeting using TTS module 120, voicemail server 20a plays the appropriate greeting to the calling party. For example, in particular embodiments, voicemail server 20a plays the appropriate greeting by generating a plurality of Voice over Internet Protocol (VoIP) packets 180 containing audio data associated with the appropriate greeting and transmitting VoIP packets 180 to the communication device 60 being used by the calling party, in this example communication device 60a. Communication device 60a may then generate audio signals for the calling party based on the audio data included in VoIP packets 180.

The calling party may then choose to leave a voicemail message 26 for the called party or may choose to call back later and/or take appropriate actions based on the greeting. For example, if the greeting indicates that the called party will be on vacation for the remainder of the week, the calling party may attempt to contact another party if a response is needed before the called party is scheduled to return. Furthermore, the calling party may adjust the contents of any voicemail message 26 left by the calling party based on the greeting. Thus, particular embodiments of communication system 10 may facilitate more efficient use of voicemail services.

Received Voicemail Messages

In addition to or instead of providing presence information 96 in voicemail greetings, voicemail servers 20 may also provide a presence indicator to a user (referred to here as the "recipient") retrieving voicemail messages 26 from the user's account. The presence indicator indicates the presence status of another user (referred to here as the "sender") who left the voicemail messages 26 for the recipient. For example, in particular embodiments of communication system 10, the recipient may retrieve voicemail messages 26 that have been left for the user by calling an extension associated with voicemail server 20 using, for example, communication device 60b. In such an example, call manager 30a may establish a connection between communication device 60b and voicemail server 20a. The recipient may then log into a voicemail account associated with the recipient and/or take any other appropriate steps, based on the configuration and characteristics of communication system 10, to access his or her voicemail account.

Once logged into his or her account, the recipient may choose to listen to voicemail messages 26 that have been left for the recipient. In particular embodiments of communication system 10, after the recipient has listened to a voicemail message 26 saved in the recipient's account, voicemail server 20a may prompt the recipient to determine whether the recipient would like to receive presence information 96 for the sender who left that voicemail message 26. The recipient may then request that voicemail server 20a provide current presence information 96 for the sender who left the voicemail message 26 by, for example, pressing a particular button on a keypad of communication device 60b. Additionally, particular embodiments of communication system 10 implement security policies and presence server 90a, voicemail server 20a, or another voicemail server 20 associated with the sender may determine whether the recipient is authorized to access presence information 96 for the sender. If not, voicemail server 20a may indicate that the recipient is not authorized to access the requested presence information 96, terminate replaying of the voicemail message 26, and/or take any other appropriate steps.

If, however, voicemail server 20a or another component of communication system 10 determines that the recipient is authorized to access presence information 96 for the sender, voicemail server 20a may identify the sender. Voicemail server 20a may identify the sender in any appropriate manner. In particular embodiments, voicemail server 20a identifies the sender by reading a device identifier, such as a phone number, an extension, an IP address, or any other suitable identifier, from the header of the relevant voicemail message 26. The device identifier identifies a communication device 60 used by the sender to record the voicemail message 26. In such embodiments, voicemail server 20a may then identify the sender based on the identified communication device 60 and information stored in user table 130. This process is described in greater detail below with respect to FIGS. 2A and 2B. Voicemail server 20a then generates presence request 92 that identifies the sender of voicemail message 26 and transmits presence request 92 to presence server 90a, as described above. By way of illustration, voicemail server 20a generates an example presence request 92 in FIG. 1 requesting presence information 96 for "Jones, Steve."

In response to receiving presence request 92, presence server 90a generates or accesses presence information 96 associated with the sender. Presence server 90a may then transmit to voicemail server 20a a presence response 94 that includes current presence information 96 associated with the sender, as described above. By way of illustration, the example presence response 94 shown in FIG. 1 includes presence information 96 indicating that the relevant user is "On Vacation."

Upon receiving presence response 94 from presence server 90a, voicemail server 20a selects a stored presence indicator 172 or generates a presence indicator to play to the user, based on presence information 96 included in the received presence response 94. Presence indicators 172 may represent any appropriate form of audio data, such as a WAV file, and may indicate the presence status of the sender in any appropriate manner.

For example, in particular embodiments, voicemail server 20a maintains an indicator table 170 that includes one or more stored presence indicators 172. Each stored presence indicator 172 is associated with one or more instances of presence information 96, such as "Logged In" or "On Vacation," recognized by communication system 10. Voicemail server 20a may select a stored presence indicator 172 associated with that instance of presence information 96. Alternatively, voicemail server 20a may utilize TTS module 120 to dynamically generate a presence indicator based on presence information 96, as described above with respect to the operation of voicemail servers 20 in providing greetings to callers. Furthermore, particular embodiments of voicemail server 20 may utilize both techniques, with voicemail server 20 attempting to match presence information 96 to a stored presence indicator 172 and, if no stored presence indicator 172 matches presence information 96, generating audio data using TTS module 120.

After selecting a stored presence indicator 172 or generating a presence indicator 172, voicemail server 20a plays the selected stored presence indicator 172 or generated presence indicator 172 to the user. For example, in particular embodiments, voicemail server 20a transmits a plurality of Voice over Internet Protocol (VoIP) packets 180 containing data from the selected presence indicator 172 or the generated presence indicator 172 to communication device 60b. Communication device 60b may then generate audio signals for the calling party based on the data included in VoIP packets 180. The user may then use information provided by the presence indicator 172 to determine how to respond to the voicemail message 26. For example, if the greeting indicates that the party who left the voicemail message 26 is currently in a meeting, the calling party may wait until later to return the call.

By providing presence information 96 to voicemail users, communication system 10 may facilitate more efficient use of communication services offered by communication system 10. Additionally, particular embodiments of voicemail server 20a may be capable of dynamically generating greetings and presence indications based on any available presence information 96, providing a flexible and robust solution for communicating presence information 96 to voicemail users. In this regard, particular embodiments of communication system 10 may provide several operational benefits.

Figure 2A:
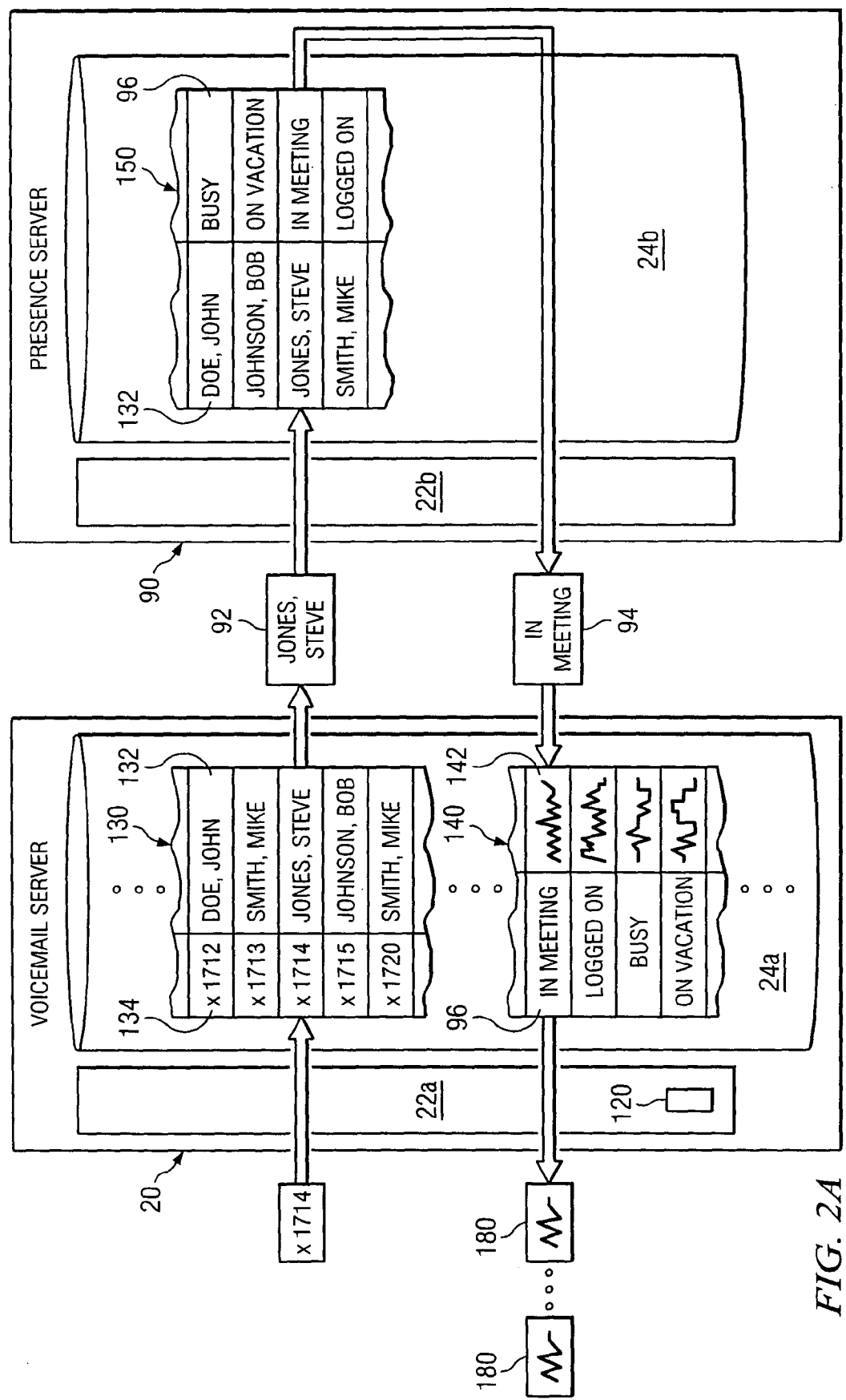
FIGS. 2A-2B are block diagrams illustrating examples of the operation of a particular embodiment of a voicemail server that may be used in the communication system of FIG. 1.
Figure 2B:
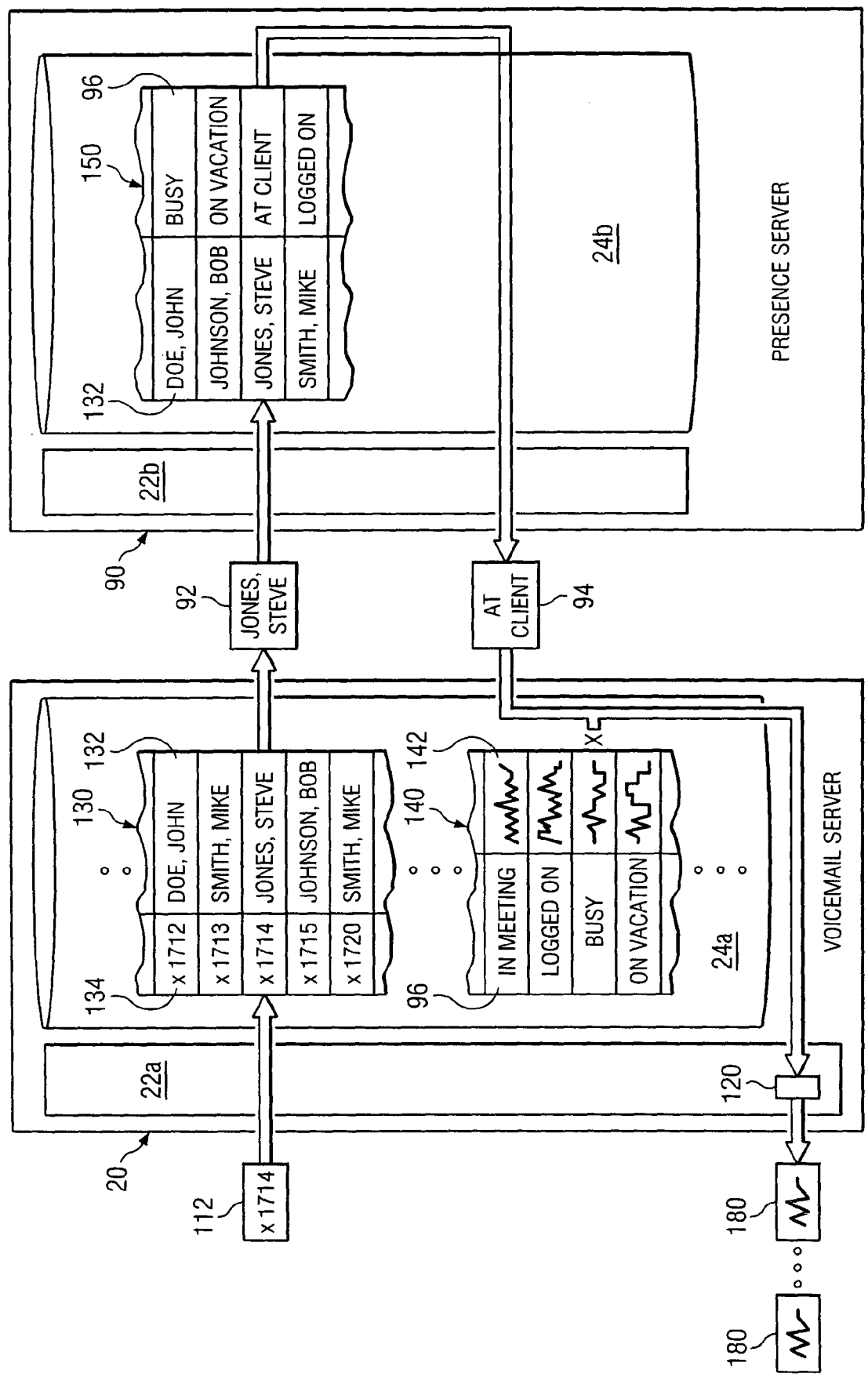

FIGS. 2A and 2B illustrate operation of particular embodiments of voicemail server 20 and presence server 90 in determining an appropriate greeting to be played to a calling party. More specifically, FIGS. 2A and 2B illustrate operation of a particular embodiment of voicemail server 20 in which voicemail server 20 attempts to match presence information 96 received from presence server 90 to a stored greeting 142 and, if unsuccessful, generates a greeting using a text-to-speech module. FIG. 2A illustrates an example of the operation of voicemail server 20 when voicemail server 20 successfully matches received presence information 96 to a stored greeting, while FIG. 2B illustrates an example in which voicemail server 20 is unable to match received presence information 96 to a stored greeting and generates a greeting instead. Although FIGS. 2A and 2B illustrate operation of voicemail server 20 and presence server 90 with respect to selecting a particular stored greeting 142 or generating audio data to play as a greeting, similar techniques may be utilized to select or generate presence indicators 172 to be provided to voicemail recipients after listening to voicemail messages 26, as described above with respect to FIG. 1.

FIG. 2A, as indicated above, illustrates operation of particular embodiments of voicemail server 20 and presence server 90 in selecting a greeting to play the calling party based on presence information 96 associated with the called party. Voicemail server 20 and presence server 90 may include any appropriate combination of software and/or hardware suitable to provide the described functionality. The illustrated embodiments of voicemail server 20 and presence server 90 both include a processor 22 and a memory 24.

Processors 22a and 22b (referred to generically as "processors 22" collectively or a "processor 22" singularly) are operable to execute instructions associated with the services provided by voicemail server 20 and presence server 90. Processors 22 may represent any suitable devices capable of processing and/or communicating electronic information. Examples of processor 22 include, but are not limited to, application-specific integrated circuits (ASICs), field-programmable gate arrays (FPGAs), digital signal processors (DSPs) and any other suitable specific or general purpose processors.

Memories 24a and 24b (referred to generically as "memories 24" collectively or a "memory 24" singularly) store processor instructions and/or any other appropriate information used by voicemail server 20 and presence server 90 in operation. In particular embodiments, voicemail server 20 maintains user table 130 and greeting table 140 in memory 24a, while presence server 90 maintains presence table 150 in memory 24b. Memories 24 may represent any collection and arrangement of volatile or non-volatile, local or remote devices suitable for storing data such as, for example, random access memory (RAM) devices, read only memory (ROM) devices, magnetic storage devices, optical storage devices, or any other suitable data storage devices.

TTS module 120 generates synthesized voice signals simulating pronunciation of text received by TTS module 120. TTS module 120 may include any appropriate combination of software and/or hardware suitable to provide the described functionality. In particular embodiments, TTS module 120 represents a computer application running on processor 22a.

In operation, voicemail server 20 receives call signaling message 112 identifying a destination communication device 60, device interface, and/or caller for the incoming call. In particular embodiments, call signaling message 112 may represent a SIP invitation and include a portion of the IP address or phone number for the destination communication device 60. In the illustrated embodiment, call signaling message 112 specifies an extension associated with the destination communication device 60. In particular embodiments, voicemail server 20 receives call signaling message 112 in one or more call signaling messages received when call manager 30 forwards the incoming call to voicemail server 20.

After voicemail server 20 receives call signaling message 112, voicemail server 20 identifies a user identifier 132 associated with the caller based on call signaling message 112 and information stored in user table 130. User table 130, in particular embodiments, includes a plurality of device identifiers 134 each associated with a user identifier 132 and voicemail server 20 matches all or a portion of call signaling message 112 to a device identifier 134. In particular embodiments of communication system 10, users may be assigned more than one communication device, such as an office telephone and a mobile phone, or may be assigned a communication device 60 with multiple interfaces, such as a multi-line telephone that supports multiple extensions. As a result, multiple device identifiers 134 may be associated with the same user identifier 132.

After identifying a user identifier 132 associated with the caller, voicemail server 20 generates a presence request 92 that includes the user identifier 132 associated with the matched device identifier 134. Voicemail server 20 then transmits presence request 92 to presence server 90, for example, as a SIMPLE request. Presence server 90 receives presence request 92 from voicemail server 20 and generates a presence response 94 based on information stored in presence database 150. In particular embodiments, presence server 90 maintains a presence database 150 in memory 24*b* that associates a user identifier 132 of a particular user with presence information 96 for that user. In response to receiving presence request 92, presence server 90 matches the user identifier 132 contained in the received presence request 92 to a user identifier 132 in presence database 150. Moreover, although FIGS. 2A and 2B illustrate embodiments of presence server 90 that retrieve presence information 96 from memory 24*b* in response to receipt of a presence request 92, alternative embodiments of presence server 90 may dynamically create presence information 96 when requested by voicemail server 20.

Presence server 90 then generates a presence response 94 that includes the presence information 96 associated with the user identifier 132 specified in the presence request 92. After generating presence response 94, presence server 90 transmits presence response 94 to voicemail server 20. As noted above, in particular embodiments, presence server 90 transmits presence response 94 to voicemail server 20 as a SIMPLE response that includes presence information 96 in the form of text.

Voicemail server 20 receives presence response 94 from presence server 90 and selects or generates a greeting to play the calling party based on the presence information 96 included in presence response 94 and information stored in greeting table 140. In the illustrated embodiment, greeting table 140 includes a plurality of different instances of presence information 96, each identifying a particular presence status recognized by communication system 10, and a plurality of stored greetings 142, each associated with one or more instances of presence information 96. In such an embodiment, voicemail server 20 attempts to match the presence information 96 contained in presence response 94 to a particular instance of presence information 96 in greeting table 140.

If voicemail server 20 successfully matches presence information 96 in presence response 94 to an instance of presence information 96 in greeting table 150, as voicemail server 20 does in the example illustrated by FIG. 2A, voicemail server 20 then transmits the stored greeting 142 associated with the matched presence information 96 to the communication device 60 being used by the recipient. Voicemail server 20 may also append additional audio data to the beginning or end of the selected stored greeting 142 before transmitting the selected stored greeting 142 to the relevant communication device 60. For example, voicemail server 20 may append audio data comprising a recording of the user stating his or her name, for example "This is Bill Smith, I am . . . ," to the beginning of the selected stored greeting and/or audio data comprising a recording of the user providing further instructions to the calling party, such as "Please leave a message and I will get back to you as soon as possible," to the end of the selected stored greeting 142. Voicemail server 20 then transmits the stored greeting 142 and any appropriate additional audio data to the relevant communication device 60. In the illustrated embodiment, voicemail server 20 transmits the selected stored greeting 142 as data in a plurality of Voice over Internet Protocol (VoIP) packets 180.

FIG. 2B illustrates operation of the same embodiments of voicemail server 20 and presence server 90 in an example in which voicemail server 20 is not able to match the presence information 96 received from presence server 90 to a stored greeting 142. As a result, voicemail server 20 generates a greeting to play the calling party using TTS module 120. In the illustrated embodiments, voicemail server 20 and presence server 90 include the same components as in FIG. 2A.

As described above with respect to FIG. 2A, voicemail server 20 receives call signaling messages 112 when the incoming call is forwarded to voicemail server 20. Voicemail server 20 matches all or a portion of call signaling message 112 to a device identifier 134 in user table 130. Voicemail server 20 then transmits a presence request 92 that includes the user identifier 132 associated with the matched device identifier 134.

Presence server 90 receives presence request 92 from voicemail server 20. Presence server 90 matches the user identifier 132 contained in the received presence request 92 to a user identifier 132 in presence database 150. Presence server 90 then generates a presence response 94 that includes the presence information 96 associated with the matched user identifier 132. After generating presence response 94, presence server 90 transmits presence response 94 to voicemail server 20. As noted above, although FIG. 2B illustrates an embodiment of presence server 90 that retrieves presence information 96 from memory 24*b* in response to receipt of a presence request 92, alternative embodiments of presence server 90 may dynamically create presence information 96 when requested by voicemail server 20.

Voicemail server 20 receives presence response 94 from presence server 90 and attempts to match the presence information 96 contained in presence response 94 to a particular instance of presence information 96 in presence database 150. In the example illustrated in FIG. 2B, voicemail server 20 is unable to match the presence information 96 in presence response 94 to an instance of presence information 96 in greeting table 140.

As a result of the fact that voicemail server 20 is unable to match the received presence information 96 to any instance of presence information 96 in presence table 150, voicemail server 20 generates a greeting using TTS module 120. More specifically, voicemail server 20 inputs the presence information 96 received from presence server 90 into TTS module 120. TTS module 120 generates audio data representing synthesized speech signals pronouncing the text included in the received presence information 96. As described above with respect to FIG. 2A, voicemail server 20 may append any additional audio information to the beginning or end of the generated audio data. Voicemail server 20 then transmits the generated audio data and any additional audio information to the relevant communication device 60. For example, in the illustrated embodiment, TTS module 120 generates the audio data as a plurality of VoIP packets 180 that voicemail server 20 then transmits to the relevant communication device 60.

Although FIGS. 2A and 2B illustrate operation of voicemail server 20 and presence server 90 in generating a greeting to be played to the caller of an incoming call that is forwarded to voicemail server 20, similar matching techniques may be used to select a stored presence indicator 172, or to generate audio data for a presence indicator, for users retrieving voicemail message 26 from their account. In such embodiments, voicemail server 20 may utilize information stored in the header of the relevant voicemail message 26 in place of call signaling message 112. For example, voicemail server 20 may access a header of the relevant voicemail message 26 to obtain an extension associated with the caller who left the voicemail message 26 and then match that extension to a device identifier 134 in user table 130 as discussed above. Operation may then proceed as described in FIGS. 2A and 2B.

FIG. 3 is a flowchart describing example operation of a particular embodiment of voicemail server 20 when an incoming call from a source communication device 60 is forwarded to voicemail server 20. The described process begins at step 400 with voicemail server 20 receiving call signaling message 112 that identifies a destination communication device 60 for the incoming call. In particular embodiments, call signaling message 112 represents a phone number or extension for the destination communication device 60.

At step 410, voicemail server 20 identifies a user identifier 132 associated with the destination communication device 60 specified by call signaling message 112. The user identifier 132 may represent text comprising the user's name, a numeric identifier associated with the user, or any other appropriate form of identifier to identify the relevant user. Voicemail server 20 determines whether the calling party is authorized to receive presence information 96 at step 420. If the calling party is not authorized to receive presence information 96, voicemail server 20 transmits a default greeting to a source communication device 60 for the incoming call at step 430. Voicemail server 20 then continues operation at step 500.

If the calling party is authorized to receive presence information 96, voicemail server 20 transmits a presence request 92 to presence server 90 that includes the identified user identifier 132 at step 440. At step 450, voicemail server 20 receives a presence response 94 from presence server 90. Presence response 94 includes presence information 96 describing a presence status of the called party. Voicemail server 20 determines whether the received presence information 96 matches any stored presence information 96 at step 460. If the received presence information 96 is associated with a particular stored greeting 142, voicemail server 20 transmits a stored greeting 142 associated with the matched presence information 96 to the source communication device 60 at step 470.

If presence information 96 does not match any stored presence information 96, voicemail server 20 generates a greeting from presence information 96 using TTS module 120 at step 480. Voicemail server 20 then transmits the generated greeting to the source communication device 60 at step 490. Voicemail server 20 may then receive audio data from the source communication device 60 at step 500. Voicemail server 20 may record a voicemail message 26 that includes the received audio data at step 510.

Figure 4:
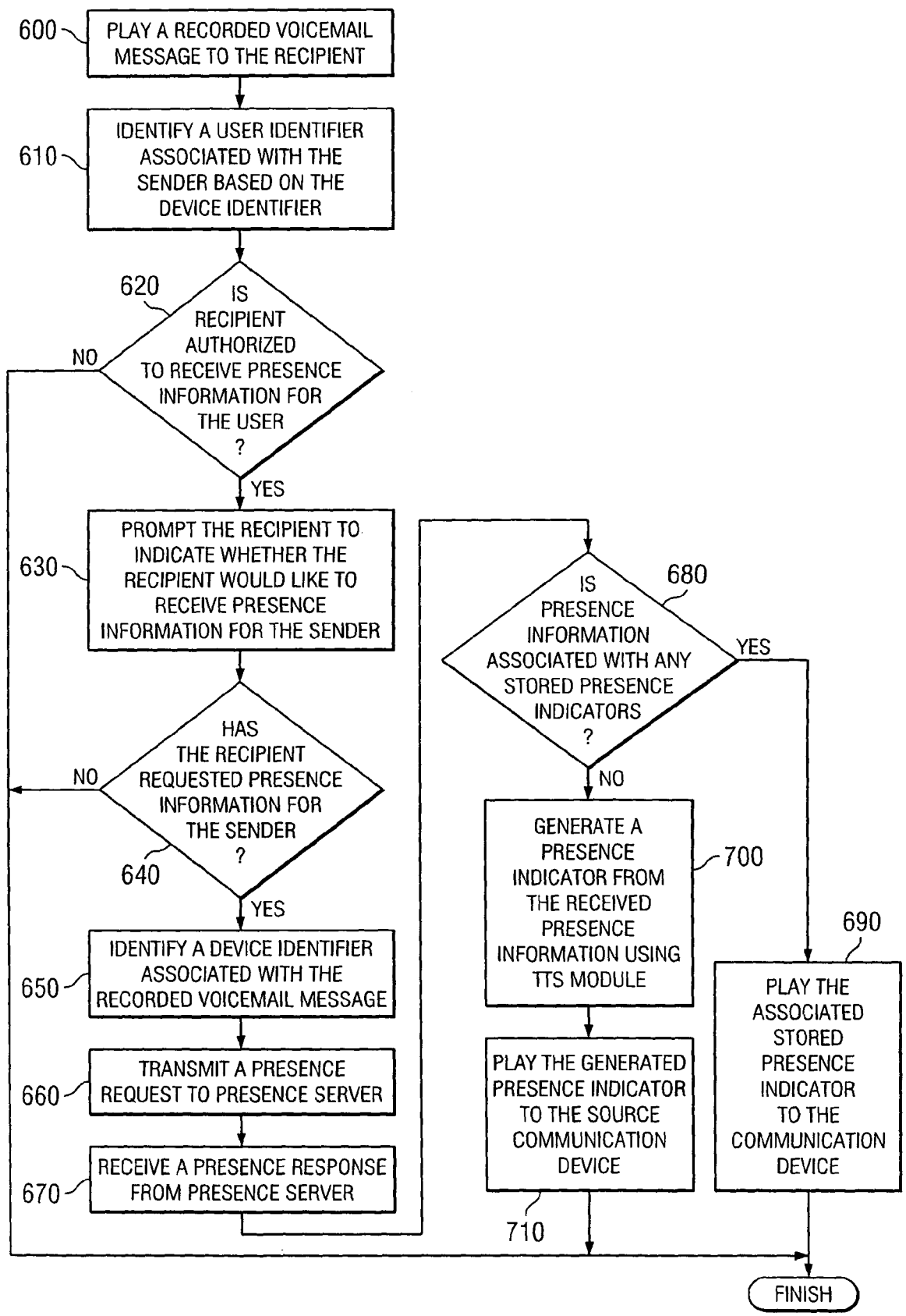
FIG. 4 is also a flowchart illustrating additional aspects of an example operation of the voicemail server.

FIG. 4 illustrates a flowchart describing example operation of a particular embodiment of voicemail server 20 in providing a presence indicator 172 to a voicemail recipient accessing a voicemail message 26 from a sender. The described process begins at step 600 with voicemail server 20 playing a recorded voicemail message 26 to the recipient. After playing the voicemail message 26, voicemail server 20 may identify, at step 610, a user identifier 132 associated with the sender of the voicemail message 26 based on the device identifier 134. User identifier 132 may represent text comprising the user's name, a numeric identifier associated with the user, or any other appropriate form of identifier to identify the relevant user. Voicemail server 20 then determines whether the recipient is authorized to receive presence information 96 for the sender at step 620. If the recipient is not authorized to receive presence information 96 for the sender, operation may end at that point.

If the recipient is authorized to receive presence information 96, voicemail server 20 then prompts the recipient to indicate whether the recipient would like to receive presence information 96 for the sender at step 630. At step 640, voicemail server 20 determines whether the recipient has requested presence information 96 for the sender. If the recipient has not requested presence information, operation ends.

If the calling party has requested to receive presence information 96, voicemail server 20 identifies a device identifier 162 associated with the recorded voicemail message 26 at step 650. In particular embodiments, device identifier 162 is stored in a header of the recorded voicemail message 26. At step 660, voicemail server 20 transmits a presence request 92 to presence server 90 that includes the user identifier 132 associated with the sender. At step 670, voicemail server 20 receives a presence response 94 from presence server 90. Presence response 94 includes presence information 96 describing a presence status of the sender. Voicemail server 20 determines whether presence information 96 is associated with any of a plurality of stored presence indicators 172 at step 680. If presence information 96 is associated with a particular stored presence indicator 172, voicemail server 20 plays the associated stored presence indicator 172 to the communication device 60 the recipient is using to contact voicemail server 20 at step 690 and operation ends. If the received presence information 96 is not associated with any stored presence information 96, voicemail server 20 generates a presence indicator 172 from the received presence information 96 using TTS module 120 at step 700. Voicemail server 20 then plays the generated presence indicator 172 to the source communication device 60 at step 710 and operation ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of providing communication service, comprising:
   communicating a message to a recipient of the message;
   receiving, from the recipient, a request to receive presence information for a sender of the message;
   in response to receiving the request, accessing textual presence information associated with the sender, the textual presence information comprising text that indicates a presence status of the sender;
   determining whether any of a plurality of stored presence indicators stored in an electronic memory are associated with the textual presence information;
   in response to determining that one of the stored presence indicators is associated with the presence information, communicating audio data from the associated presence indicator to the recipient; and
   in response to determining that none of the stored presence indicators is associated with the presence information, generating audio data based on the textual presence information and communicating the audio data to the recipient.

2. The method of claim 1, wherein receiving the request from the recipient comprises:

prompting the recipient to request presence information; and receiving the request from the recipient.

3. The method of claim 1, wherein communicating the presence indicator comprises:
   selecting the presence indicator from a plurality of stored presence indicators, based on the presence status of the sender; and
   communicating the selected presence indicator to the recipient.

4. The method of claim 1, wherein determining the presence status comprises receiving presence information, the presence information comprising text that indicates the presence status of the sender, and wherein communicating the presence indicator comprises:
   generating audio data based on the textual presence information; and
   communicating the audio data to the recipient.

5. The method of claim 1, wherein communicating the presence indicator to the recipient comprises:
   generating a plurality of data packets, each data packet comprising at least a portion of the presence indicator; and
   transmitting the data packets to a communication device being used by the recipient.

6. The method of claim 1, wherein the message comprises a voicemail message, and further comprising receiving a device identifier that identifies a communication device associated with the sender of the voicemail message, and wherein determining a presence status of the sender comprises:
   determining a user associated with a communication device used to record the voicemail message; and
   determining a presence status of the user.

7. The method of claim 6, wherein the message comprises a voicemail message, and wherein determining a presence status of the user comprises:
   transmitting a presence request comprising a user identifier to a presence server, the user identifier identifying the user associated with the communication device used to record the voicemail message;
   receiving a presence response from the presence server, the presence response comprising presence information that indicates a presence status of the user associated with the communication device used to record the voicemail message.

8. A device for providing communication service comprising:
   a memory operable to store processor instructions; and
   a processor operable to:
      communicate a voicemail message to a recipient of the voicemail message;
      determine that the recipient desires to receive presence information for a sender of the voicemail message;
      in response to determining that the recipient desires to receive presence information for the sender, access textual presence information associated with the sender, the textual presence information comprising text that indicates a presence status of the sender
      determine whether any of a plurality of stored presence indicators are associated with the textual presence information;
      in response to determining that one of the stored presence indicators is associated with the presence information, communicate audio data from the associated presence indicator to the recipient; and
      in response to determining that none of the stored presence indicators is associated with the presence information, generate audio data based on the textual presence information and communicating the audio data to the recipient.

9. The device of claim 8, wherein the processor is operable to determine that the recipient desires to receive presence information by:
   prompting the recipient to indicate whether the recipient desires to receive presence information for the sender; and
   receiving an indication from the recipient that the recipient desires to receive presence information for the sender.

10. The device of claim 8, wherein the processor is operable to communicate the presence indicator by:
    selecting the presence indicator from a plurality of stored presence indicators, based on the presence status of the sender; and
    communicating the selected presence indicator.

11. The device of claim 8, wherein the processor is operable to determine the presence status by receiving presence information, the presence information comprising text that indicates the presence status of the sender, and wherein the processor is operable to communicate the presence indicator by:
    generating audio data based on the textual presence information; and
    communicating the audio data to the recipient.

12. The device of claim 8, wherein the processor is operable to communicate the presence indicator to the recipient by:
    generating a plurality of data packets, each data packet comprising at least a portion of the presence indicator; and
    transmitting the data packets to a communication device being used by the recipient.

13. The device of claim 8, wherein the processor is further operable to, further receive a device identifier that identifies a communication device associated with the sender of the voicemail message, and wherein the processor is operable to determine a presence status of the sender by:
    determining a user associated with a communication device used to record the voicemail message; and
    determining a presence status of the user.

14. The device of claim 13, wherein the processor is operable to determine a presence status of the user comprises:
    transmitting a presence request comprising a user identifier to a presence server, the user identifier identifying the user associated with the communication device used to record the voicemail message;
    receiving a presence response from the presence server, the presence response comprising presence information that indicates a presence status of the user associated with the communication device used to record the voicemail message.

15. A system for providing communication service comprising:
    a first communication device operable to initiate a call to a second communication device;
    the second communication device;
    a call manager operable to forward the call to a voicemail server if a recipient associated with the second communication device does not answer the call;
    a voicemail server operable to:
       receive the call forwarded by the call manager;
       record a voicemail message from a sender using the first communication device;
       communicate the voicemail message to a recipient of the voicemail message;

determine that the recipient desires to receive presence information for the sender of the voicemail message;

in response to determining that the recipient desires to receive presence information for the sender, access textual presence information associated with the sender, the textual presence information comprising text that indicates a presence status of the sender; and communicate a presence indicator to the recipient, wherein the presence indicator specifies the presence status of the sender;

determine whether any of a plurality of stored presence indicators are associated with the textual presence information;

in response to determining that one of the stored presence indicators is associated with the presence information, communicate audio data from the associated presence indicator to the recipient; and in response to determining that none of the stored presence indicators is associated with the presence information, generate audio data based on the textual presence information and communicating the audio data to the recipient.

16. The system of claim 15, wherein the voicemail server is operable to determine that the recipient desires to receive presence information by:

prompting the recipient to indicate whether the recipient desires to receive presence information for the sender; and receiving an indication from the recipient that the recipient desires to receive presence information for the sender.

17. The system of claim 15, wherein the voicemail server is further operable to store a plurality of presence indicators and wherein the voicemail server is operable to communicate the presence indicator by:

selecting, based on the presence status of the sender, a presence indicator from the plurality of stored presence indicators; and communicating the selected presence indicator.

18. The system of claim 15, wherein:

the voicemail server is operable to determine the presence status by receiving presence information, wherein the presence information comprises text that indicates the presence status of the sender;

the voicemail server comprises a text-to-speech (TTS) module operable to generate audio data based on text in the presence information; and the voicemail server is operable to communicate the presence indicator by communicating audio data generated by the TTS module to the recipient.

19. The system of claim 15, wherein the voicemail server is operable to communicate the presence indicator to the recipient by:

generating a plurality of data packets, each data packet comprising at least a portion of the presence indicator; and transmitting the data packets to the first communication device.

20. The system of claim 15, wherein the voicemail server is operable to communicate the presence indicator by accessing a portion of the voicemail message that includes a device identifier identifying the first communication device, and wherein the processor is operable to determine a presence status of the sender by:

determining the sender associated with the second communication device; and determining a presence status of the sender.

21. The system of claim 20, further comprising a presence server operable to:

determine a presence status for each of a plurality of users;

store presence information associated with each of the plurality of users, the presence information indicating the presence status of that user;

receive a presence request from a remote element, the presence request identifying one of the users, and in response to receiving the presence request, transmit a presence response to the remote element, the presence response including presence information associated with the identified user; and wherein the voicemail server is operable to determine the presence status of the sender by:

transmitting a presence request comprising a user identifier to the presence server, the user identifier identifying the sender; and receiving a presence response from the presence server, the presence response comprising presence information that indicates a presence status of the sender.

22. A system for providing communication service comprising:

means for communicating a voicemail message to a recipient of the voicemail message;

means for determining that the recipient desires to receive presence information for a sender of the voicemail message;

means for accessing textual presence information associated with the sender, the textual presence information comprising text that indicates a presence status of the sender;

means for determining whether any of a plurality of stored presence indicators are associated with the textual presence information;

means for communicating audio data from the associated presence indicator to the recipient in response to determining that one of the stored presence indicators is associated with the presence information; and means for generating audio data based on the textual presence information and communicating the audio data to the recipient in response to determining that none of the stored presence indicators is associated with the presence information.

* * * * *